Aug. 13, 1968  E. I. VALYI  3,396,782

HEATING UNIT

Filed Feb. 15, 1967

INVENTOR:
EMERY I. VALYI
BY
ATTORNEY

United States Patent Office 3,396,782
Patented Aug. 13, 1968

3,396,782
HEATING UNIT
Emery I. Valyi, Riverdale, N.Y., assignor to Olin Mathieson Chemical Corporation, a corporation of Virginia
Continuation-in-part of application Ser. No. 495,744, Aug. 30, 1965, which is a division of application Ser. No. 398,128, Sept. 21, 1964, now Patent No. 3,289,750, which in turn is a division of application Ser. No. 202,612, June 14, 1962, now Patent No. 3,201,858. This application Feb. 15, 1967, Ser. No. 616,361
4 Claims. (Cl. 165—110)

ABSTRACT OF THE DISCLOSURE

This disclosure teaches a compound heating unit having the following components: a sheet metal member with a system of fluid passages therein; a sheet-like porous body metallurgically bonded to a first portion of the sheet metal member; a channel or channels between the porous body and the sheet metal member; with a portion of the sheet metal member in heat exchange relationship of said porous body.

---

This application is a continuation-in-part of copending application Ser. No. 495,744, filed Aug. 30, 1965 now abandoned, which in turn is a division of U.S. patent application Ser. No. 398,128, filed Sept. 21, 1964, now U.S. Patent 3,289,750, which in turn is a division of U.S. patent application Ser. No. 202,612, filed June 14, 1962, now U.S. Patent 3,201,858. Said U.S. patent application Ser. No. 202,612 is in turn a continuation-in-part of U.S. patent application Ser. No. 732,663, filed May 2, 1958, now U.S. Patent 3,049,795, which in turn is a continuation-in-part of U.S. patent application Ser. No. 586,259, filed May 21, 1956, now abandoned.

As brought out in the aforesaid copending applications, the subject matter thereof was directed to novel features wherein a permeable body formed of powdered metal is joined to a supporting metal structure so as to become integral therewith in all areas except where they are formed between the permeable and impervious portions of the structure.

The resultant porous fabrication may be utilized advantageously in various applications. For xeample, it may be employed in the subsequent manufacture of gas burners that are intended to provide evenly distributed heat over large surfaces. In such application a combustible gas is distributed by the fluid channels to different portions of the permeable body through which it flows to emanate on the combustion side thereof substantially uniformly over most of the surface of that body at a substantially uniform rate, thus producing a flame blanket. The resultant porous fabrication may also be utilized advantageously in the construction of evaporative coolers whereby an efficient cooling surface is obtained by using the porous metal body as a means through which to distribute over a large area the liquid which is to evaporate for the purposes of transpiration cooling. As will be recognized, one of the most important limitations restricting the use of porous fabrications resides in the fact that it is very difficult and costly to provide conduits which conduct fluids efficiently to the appropriate faces or portions of the porous metal bodies, and therefrom to be distributed into and through such porous metal bodies for the purposes of combustion, evaporation, filtration, or other purposes. Another limitation of porous metal bodies restricting their use in components designed to transfer heat from one medium to another derives from the fact that the heat conduction of such porous bodies is less than that of solid metal bodies and that it is difficult and costly to effect efficient heat transfer to the porous bodies and through them. While the techniques and methods of producing pervious or porous bodies from powder metal have been extensively discussed in the literature such as for example in "Powder Metallurgy," by Dr. Paul Schwarzkopf (the MacMillan Company, New York, 1947) and "Powder Metallurgy" edited by John Wulff (the American Society for Metals, Cleveland, 1942), no economical and efficient method has been found thus far to overcome the limitations above referred to prior to the invention described in the aforesaid copending applications; the basic concept of the contribution therein comprises the forming of an intergral structure of two or more metal layers of differing characteristics, of which at least one layer is porous and pervious to fluids, such as gases or liquids, and the others impervious and solid, these layers being secured together, preferably through a sintering operation, although brazing and other means may also be employed, so as to enable the formation of fluid channels in predetermined portions bteween the confronting faces of various layers comprising the integrated porous structure.

In accordance with the disclosure of the aforesaid copending applications, the porous fabrication is formed from a supporting sheet metal member which may have all or a portion thereof in the form of a flat, relatively thin plate, sheet, or strip. A pattern of weld-inhibiting material is applied to this member in a design corresponding to that desired for the fluid conducting channels which are to be provided in the ultimate structure. Following the application of the weld-inhibiting material, a substantial layer of powdered metal aggregate is deposited upon the plate thus treated. Subsequent thereto this composite structure may be subjected to pressure to compact the powdered metal and to press it firmly against the solid plate. This compacted assembly is then exposed to a suitable sintering temperature under conditions preventing undesired reactions, such as oxidation of the metal. This sintering operation accomplishes the sintering of the powdered metal particles to each other together with the metallurgical bonding, welding, of the sintered metal aggregate to the solid member.

In an alternate method disclosed in the foregoing copending applications, the powder metal layer may be separately formed by known powder metallurgy techniques. In this method the solid sheet metal member may be first prepared by applying a pattern of weld-inhibiting material to the portions thereof at which the fluid channels are to be formed, and applying to one side of the porous metal layer a suitable thin layer of soldering or brazing metal. The porous metal layer is then superimposed upon the solid plate so as to sandwich the weld-inhibiting material between them, and the composite subjected to a thermal treatment to accomplish the brazing or soldering of the porous metal layer to the sheet metal member in all adjacent areas thereof except in those portions separated by the weld-inhibiting material.

The resultant composite structure may now be adapted for the conducting of fluids by deforming or flexing those portions of the sheet metal member, which are disposed opposite the weld-inhibiting material, away from the porous metal layer. This can be accomplished for example by introducing a fluid under pressure into the ununited portions of the composite structure formed between the porous layer and a sheet metal member, or mechanically, by insertion of suitable mandrels into these areas. This deformation of the sheet metal member away from the porous metal layer will form fluid channels defined on one side by an impervious metal wall portion and on the other side by the porous metal.

As will be understood, various combinations of materials may be utilized in forming the integrated composite structure; and accordingly the solid sheet metal member and the porous layer or body may be of the same metal or alloy, or the porous structure and the solid member, of the integrated structure, may be comprised of different compositions. For example, both the porous metal layer and a solid sheet metal member may be formed of the same stainless steels, coppers, brass, carbon steels, aluminum or various combinations thereof. As will be understood the ultimate use of the resultant integrated structure determines the specific combination of alloys to be employed. Accordingly, among the objects of this invention is to provide a novel fluid permeable porous metal structure adapted to distribute a fluid and heat in flow therethrough.

Other objects and advantages of this invention will become more apparent from the following drawings and description in which.

Figure 1:
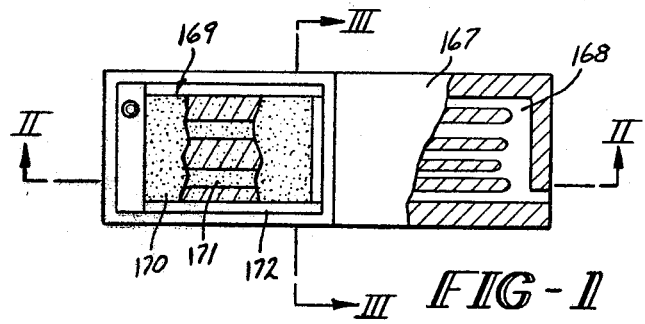
FIGURE 1 illustrates one embodiment of the heating unit of the present invention in a preliminary stage of fabrication with portions cut away.
Figures 2, 3:
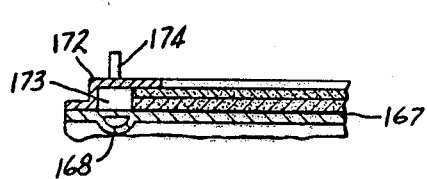
FIGURE 2 is a partial sectional view along lines II—II of FIGURE 1.
FIGURE 3 is a partial sectional view along lines III—III of FIGURE 1.
Figure 4:
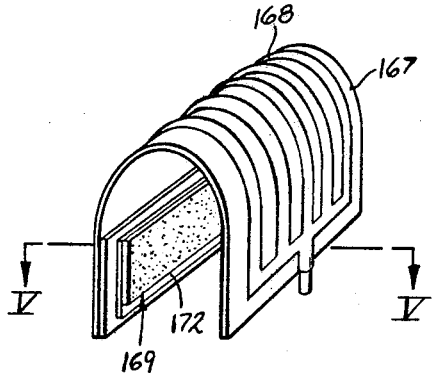
FIGURE 4 illustrates the embodiment of FIGURE 1 in a later stage of fabrication.
Figure 5:
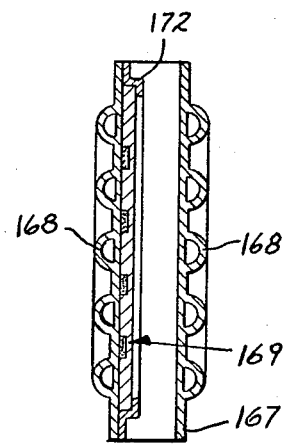
FIGURE 5 is a sectional view along lines V—V of FIGURE 4.

Broadly, the heating unit of the present invention comprises: a sheet metal member provided internally therein with a system of fluid passageways; inlet and outlet means communicating with said passageways; a sheet-like porous body metallurgically bonded to a face of a first portion of said member; enclosed channel means disposed between said body and said first portion; inlet means communicating with said channel means; and a second portion of said member facing said body in adjacent and spaced relationship thereto.

In regard to production of the porous body, it may be obtained by the so called gravity sintering method which comprises a process wherein graded metal power, frequently spherical metal powder, is poured by gravity into an appropriately shaped confined space, and usually vibrated to cause it to compact uniformly. As is obvious the choice of particle size of the metal powder will largely determine the amount of porosity, i.e., void space. The metal powder or aggregate so packed is then sintered in accordance with well-known powder metallurgy practices, producing a porous metal body whose bulk density, or apparent density, is but a fraction of the density of the metal or alloy from which the powder particles are obtained.

As will be understood, the selection of materials from which the porous and solid components are made to comprise the structures described herein and in the copending applications, is based on considerations within the skill of persons acquainted with mechanical, physical and chemical properties of materials. While the structures described herein have been identified as being metallic on numerous occasions, it is pointed out that all or parts of these structures may be made of non-metallic materials, as called for by their intended use. Thus, the porous layer may incorporate catalysts, as pointed out in the copending applications, which catalysts may be non-metallic. The porous layer may also consist in part or entirely of glasses, carbides, nitrides, oxides, or borides, for example in instances calling for heat resistance, corrosion resistance or insulating properties not available in metals and alloys. The porous layer may also consist of synthetic polymeric substances, for similar reasons, as for example sintered porous fluoro-carbon resins, silicone resins, and others. The solid components is usually made of metal strip or plate which may be coated with non-metallic materials of the kind referred to. In instances not calling for high strength the solid component may also be made of synthetic resins made into strip, sheet or plate stock.

Non-metallic components may be utilized. Thus, a component intended to distribute highly corrosive inorganic acid vapors may be made of fluorocarbon resins; another intended to serve as diffuser of combustible gas also acting as a radiant burner may be made in part of silicone carbide. Other examples are obvious to those skilled in the art of constructing components to be used in environments of high temperature and corrosive attack.

As indicated above, the composite structures of this invention are adapted for many applications and particularly for use as heat exchangers. As is well known, tubular components used in heat exchangers were heretofore usually provided with fins, corrugations and other extensions of their surface so as to present an economic maximum extended surface area for a given weight of heat exchanger structure. However, such heat exchanger structures can be provided with greatly increased heat transfer surfaces by i.e. heat conductive bonding of a solid sheet metal unit to a sheet-like layer of sintered porous metal in accordance with any of the methods described heretofore. As has been discussed the sheet-like porous metal component is attached to the solid sheet metal unit by a metallic bond which will warrant good heat transfer with channels provided between the confronting faces of the components by interrupting the metallurgical bond in predetermined areas and in a predetermined pattern. These channels serve to conduct a fluid between the solid and porous layers with subsequent diffusion of flow through the porous body, thereby contacting the larger surface area within the porous body, as defined by the innumerable interstices extending between the integrated particles of the porous body. For example for application in refrigerator systems, where the solid sheet metal unit is internally laminated with its laminations distended into a system of fluid passageways, the fluid contained within the solid metal component may be water and the fluid contained within the channels may be liquid refrigerant or refrigerant vapor, as would be the case when such composite structures are used as refrigeration condensers or evaporators.

The heating unit of the present invention will be more readily understood from a consideration of the drawings which form a part of the present specification. For example, as shown in FIGURES 1 to 5, the solid tubular structure may be comprised of an integral sheet metal unit 167 suitably laminated internally, as for example, by the process of the aforesaid U.S. Patent No. 2,690,002, and suitably distended with the distentions constrained to be bulged out of only one face of the sheet metal unit. The resultant unit 167 will be adapted in this manner to contain a pattern of fluid passageways 168 extending throtugh the length of the unit. This unit can be adapted to the construction of a water heater by metallurgically bonding to a portion adjacent one of its longitudinal ends a porous composite 169 comprised of an outer porous component 170 encasing within it a second porous component 171 of greater porosity to provide suitable fluid channels, and with the porous composite suitably mounted within mounting brackets 172 forming at one end thereof a header chamber 173 to which is interconnected an inlet conduit 174. Thereafter, the portion of the sheet metal unit 167 adjacent the other longitudinal end will be folded over on itself over that portion metallurgically bonded to the porous composite so as to be disposed adjacent to it. In this manner, the water to be heated may be introduced into the fluid passageways 168 adjacent that portion of them disposed opposite the gas burner assembly comprised of the porous composite 169 whereat the water is preheated while cooling the burner, with the water subsequently flowing to that portion of the sheet metal unit 167 disposed opposite the burner assembly wherein the water is heated to the desired temperature.

It is also noted that an additionally improved burner structure can be made by the following modification: radiant burners, known as flame tubes or radiant tube burners, operate by injecting a gas and air mixture in one end of a tube which may be several feet long, with sufficient velocity for the flame to propagate over the entire length of the tube, heating the tube internally to a temperature at which the walls of the tube will radiate heat. Such radiant tube burners are frequently used in industry, as in heat treating furnaces where they combine the efficient heating with containment of the combustion atmosphere. The heating efficiency of such radiant tube heaters may be substantially enhanced by providing rough inside walls in the tubes causing appreciable turbulence to take place. Unfortunately, flame impingement and the erosion caused by it will usually obliterate any surface roughness within the tubes and after a comparatively short time, such internally roughened tubes will be no better than ordinary radiant tube heaters. In light of this, such structures may be improved by applying a comparatively smooth but pervious porous metal component in the form of a layer on the inside of the tube with fluid channels disposed between the tube and the porous component, in a manner similar to that employed in the preceding embodiments, except, of course, for the fact that the porous metal component here is inside of the solid tube, whereas it has been described as being disposed on the external surface of a face with regard to the specific burner embodiments discussed before. Such modification of the tube adapts it to similar use as any other radiant burner tube, in other words, a flame is caused to propagate within the tube from one end; however, in this instance, either additional fuel or air is also caused to flow through the channels placed between the porous metal component and the solid tubular structure, and to intermingle with the gases of the main flame stream. In this manner, this secondary supply of gas will "spoil" the smooth flow pattern of the main gas stream, resulting in turbulence at the boundary adjoining the powder metal layer. Thus, the same result is accomplished as in prior attempts to roughening the interior of the tube, but in contrast providing better control and without accompanying wear and erosion. In addition, the turbulent layer in accordance with this improvement enhances a measure of protection in improving the life of the burners.

Figure 6:
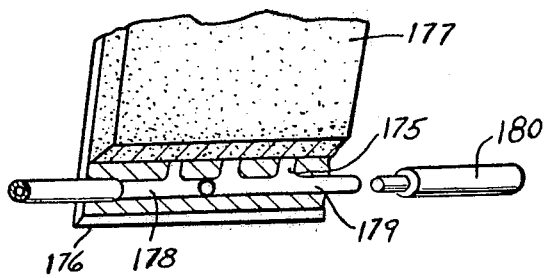
FIGURE 6 is a partial view, with portions cut away, of a control means for use with the heating unit of FIGURE 5.

In addition, burners may also be made from the composite structure by integrating sheet metal structural components and burners into one piece with greater convenience. Thus, for example, the inner wall of an oven may be constructed from sheet metal that in the appropriate parts is covered with the sintered porous metal component having channels connected to a gas supply. Thus, instead of a few specific burner units which are now normally used in corresponding applications and which cause local overheating and poor temperature distribution, a very uniform source of heat may be provided over a large area. Moreover, control means may be used for this type of area burner that are very simple and very effective. For example, as shown in FIGURE 6, the fluid channels 175 contained between a porous 177 and solid components 176 may be interconnected into a manifold channel 178 which slidably carries within it a valve means such as the rod 179 that may be shifted in one line and direction to open and close ports to the several channels 175 provided between the porous component 177 and the solid component 176. Any suitably actuating mechanisms may be employed for operation of the valve means 179, as for example, such as a handle 180 for manual operation.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A heating unit comprising a sheet metal member provided internally therein with a system of fluid passageways, inlet and outlet means communicating with said passageways, a sheet-like porous body bonded to a face of a first portion of said member adjacent one end thereof, enclosed channel means defined by said body and disposed in facing relationship to said first portion, second inlet means communicating with said channel means, and a second portion of said member being contiguous with the face of the first portion from which it extends lying in heat exchange relationship to the face of the first portion and the said bonded body on the face of the first portion.

2. A heating unit according to claim 1 wherein said sheet metal member is provided internally therein with laminations distended into a system of fluid passageways.

3. A heating unit according to claim 2 wherein said enclosed channel means is provided with a second porous body of greater porosity than said sheet-like porous body.

4. A heating unit according to claim 2 including a header chamber communicating with said second inlet means and said channel means.

References Cited

UNITED STATES PATENTS

| | | | |
|---|---|---|---|
| 2,021,995 | 11/1935 | Heuth | 62—523 |
| 2,194,208 | 3/1940 | Moran | 158—99 |
| 2,662,273 | 12/1953 | Long | 165—170 X |
| 2,946,681 | 7/1960 | Probst et al. | 253—77 X |
| 3,211,133 | 10/1965 | Valyi | 122—33 |

ROBERT A. O'LEARY, *Primary Examiner.*

T. W. STREULE, *Assistant Examiner.*